United States Patent
Moriya et al.

(10) Patent No.: US 10,072,141 B2
(45) Date of Patent: Sep. 11, 2018

(54) RESIN COMPOSITION, RESIN MOLDED ARTICLE, AND METHOD OF PREPARING RESIN COMPOSITION

(71) Applicant: FUJI XEROX CO., LTD., Tokyo (JP)

(72) Inventors: Hiroyuki Moriya, Minamiashigara (JP); Masayuki Okoshi, Minamiashigara (JP); Daisuke Nakayama, Minamiashigara (JP); Tsuyoshi Miyamoto, Minamiashigara (JP); Yuko Iwadate, Minamiashigara (JP); Daisuke Nakashima, Ashigarakami-gun (JP); Toshie Furuya, Ashigarakami-gun (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/200,694

(22) Filed: Jul. 1, 2016

(65) Prior Publication Data
US 2017/0037232 A1    Feb. 9, 2017

Related U.S. Application Data

(63) Continuation-in-part of application No. 15/002,097, filed on Jan. 20, 2016, now abandoned.

(30) Foreign Application Priority Data

Aug. 4, 2015 (JP) .................................. 2015-154288
Feb. 25, 2016 (JP) .................................. 2016-034686

(51) Int. Cl.
| | | |
|---|---|---|
| C08L 23/12 | (2006.01) | |
| C08K 9/08 | (2006.01) | |
| C08L 23/06 | (2006.01) | |
| C08L 23/08 | (2006.01) | |
| C08K 3/04 | (2006.01) | |
| C08L 23/10 | (2006.01) | |
| D06M 101/40 | (2006.01) | |
| D06M 15/59 | (2006.01) | |

(52) U.S. Cl.
CPC ............... *C08L 23/12* (2013.01); *C08K 3/04* (2013.01); *C08K 9/08* (2013.01); *C08L 23/06* (2013.01); *C08L 23/0815* (2013.01); *C08L 23/0853* (2013.01); *C08L 23/10* (2013.01); *D06M 15/59* (2013.01); *D06M 2101/40* (2013.01)

(58) Field of Classification Search
CPC .......................... D06M 15/59; D06M 2101/40
See application file for complete search history.

(56) References Cited

U.S. PATENT DOCUMENTS

| | | |
|---|---|---|
| 6,794,032 B2 | 9/2004 | Borgner et al. |
| 2003/0092814 A1 | 5/2003 | Borgner et al. |

FOREIGN PATENT DOCUMENTS

| | | |
|---|---|---|
| EP | 3081591 A1 | 10/2016 |
| JP | H02-58552 A | 2/1990 |
| JP | 2003-528956 A | 9/2003 |
| JP | 2014-181307 A | 9/2014 |
| JP | 2015-110749 A | 6/2015 |

OTHER PUBLICATIONS

Mar. 7, 2017 Office Action issued in Japanese Patent Application No. 2016-152067.
Feb. 1, 2017 Search Report issued in European Patent Application No. 16177909.5.

*Primary Examiner* — Vickey M Nerangis
(74) *Attorney, Agent, or Firm* — Oliff PLC

(57) ABSTRACT

A resin composition contains: polyolefin; a carbon fiber; a resin containing at least one of an amide bond and an imide bond; and a compatibilizer, the resin containing at least one of an amide bond and an imide bond forms a coating layer around the carbon fiber, and a thickness of the coating layer is from 50 nm to 700 nm.

16 Claims, 2 Drawing Sheets

RESIN COMPOSITION, RESIN MOLDED ARTICLE, AND METHOD OF PREPARING RESIN COMPOSITION

CROSS-REFERENCE TO RELATED APPLICATIONS

This application is based on and claims priority under 35 USC 119 from Japanese Patent Application No. 2015-154288 filed on Aug. 4, 2015 and Japanese Patent Application No. 2016-034686 filed on Feb. 25, 2016.

BACKGROUND

1. Technical Field

The present invention relates to a resin composition, a resin molded article, and a method of preparing a resin composition.

2. Related Art

In the related art, various resin compositions are provided and are used for various applications.

In particular, resin compositions containing a thermoplastic resin are used in various components and cases of home electronics and automobiles or are used in various components such as cases of business machines and electric and electronic apparatuses.

SUMMARY

According to an aspect of the invention, there is provided a resin composition comprising: a polyolefin; a carbon fiber; a resin containing at least one of an amide bond and an imide bond; and a compatibilizer, wherein the resin containing at least one of an amide bond and an imide bond forms a coating layer around the carbon fiber, and a thickness of the coating layer is from 50 nm to 700 nm.

BRIEF DESCRIPTION OF THE DRAWINGS

Exemplary embodiments of the present invention will be described in detail based on the following figures, wherein.

DETAILED DESCRIPTION

Hereinafter, an exemplary embodiment which is an example of a resin composition and a resin molded article according to the invention will be described.
Resin Composition The resin composition according to the exemplary embodiment includes: a polyolefin; a carbon fiber; a resin containing at least one of an amide bond and an imide bond; and a compatibilizer. The resin containing at least one of an amide bond and an imide bond forms a coating layer around the carbon fiber, and a thickness of the coating layer is from 50 nm to 700 nm.

Hereinafter, the resin containing at least one of an amide bond and an imide bond will be referred to as "specific resin".

In recent years, in order to obtain a resin molded article having high mechanical strength, a resin composition containing a polyolefin as a matrix and a reinforcing fiber is used.

In the resin composition, when affinity between the reinforcing fiber and the polyolefin is low, a space is formed in an interface therebetween, and adhesion in the interface may decrease.

In particular, when a carbon fiber is used as the reinforcing fiber in the resin composition, higher mechanical strength than that of glass fiber is required. Therefore, a decrease in the adhesion in the interface between the carbon fiber and the polyolefin causes a decrease in mechanical strength, in particular, in bending elastic modulus and tensile elastic modulus.

The resin composition according to the exemplary embodiment includes four components including: a polyolefin; a carbon fiber; a resin (specific resin) containing at least one of an amide bond and an imide bond; and a compatibilizer.

By containing the four components, the resin composition having superior bending elastic modulus and tensile elastic modulus may be obtained. The reason why the above effect is obtained is not clear but is presumed to be as follows.

When the resin composition is molten-kneaded in order to obtain a resin molded article from the resin composition according to the exemplary embodiment, the polyolefin as the matrix and the compatibilizer are melted, and a portion of the molecule of the compatibilizer and the amide bond or the imide bond contained in the molecule of the specific resin are compatibilized. As a result, the specific resin is dispersed in the resin composition.

Figure 1:
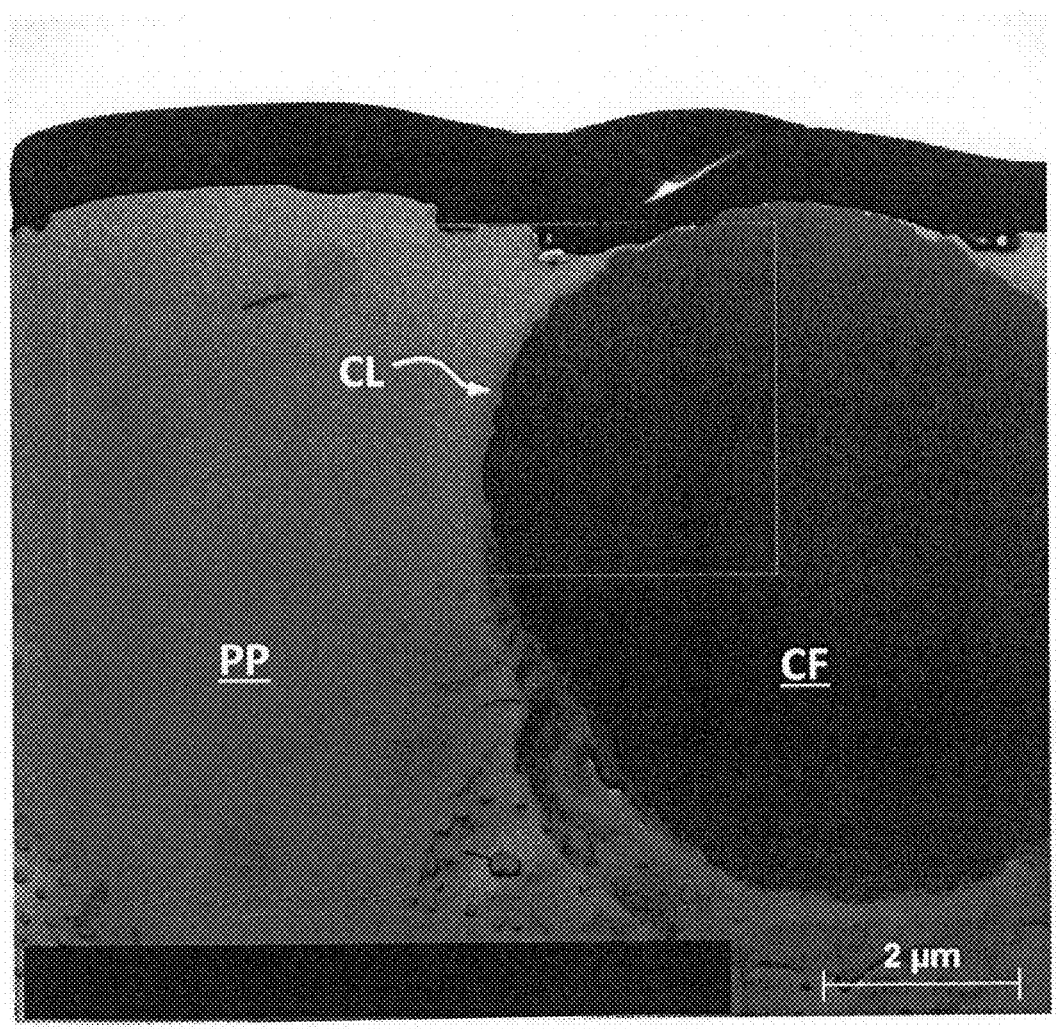
FIG. 1 is a BF-STEM image showing major parts of a resin molded article according to an exemplary embodiment of the invention.

In this state, when the specific resin contacts the carbon fiber, the amide bond or the imide bond contained in the molecule of the specific resin and a polar group present on a surface of the carbon fiber are physically bonded to each other through affinity (attraction and hydrogen bond). In addition, the polyolefin and the specific resin have low compatibility, in general. Therefore, due to repulsion between the polyolefin and the specific resin, the contact frequency between the specific resin and the carbon fiber increases. As a result, the amount or area of the specific resin bonded to the carbon fiber increases. In this way, using the specific resin, the coating layer is formed around the carbon fiber (refer to FIG. 1). In FIG. 1, PP represents the polyolefin, CF represents the carbon fiber, and the CL represents the coating layer.

The specific resin forming the coating layer is also compatibilized with a portion of the molecule of the compatibilizer. Therefore, by the compatibilizer being compatibilized with the polyolefin, an equilibrium state is formed between attraction and repulsion, and the coating layer formed using the specific resin has a small thickness of from 50 nm to 700 nm and is substantially uniform. In particular, the affinity between a carboxy group present on a surface of the carbon fiber and the amide bond or the imide bond contained in the molecule of the specific resin is high. Therefore, it is presumed that the coating layer is easily formed around the carbon fiber using the specific resin and that the coating layer is thin and has superior uniformity. It is preferable that the carbon fiber is covered at its whole periphery with the coating layer, but a part of the periphery of the carbon fiber may not be covered.

It is presumed from the above description that the adhesion in the interface between the carbon fiber and the polyolefin increases and that the resin molded article having superior mechanical strength, in particular, superior bending elastic modulus and tensile elastic modulus may be obtained.

Here, the resin composition according to the exemplary embodiment has a structure in which the coating layer is formed around the carbon fiber using the specific resin through molten kneading during the preparation of the resin composition (for example, pellet) and injection molding and in which the thickness of the coating layer is from 50 nm to 700 nm.

In the resin composition according to the exemplary embodiment, the thickness of the coating layer formed using the specific resin is from 50 nm to 700 nm and, from the viewpoint of further improving bending elastic modulus and tensile elastic modulus, is preferably from 50 nm to 650 nm. When the thickness of the coating layer is 50 nm or more, bending elastic modulus and tensile elastic modulus are improved. When the thickness of the coating layer is 700 nm or less, the interface where the coating layer is formed between the carbon fiber and the polyolefin is prevented from being embrittled, and a decrease in bending elastic modulus and tensile elastic modulus is prevented.

The thickness of the coating layer is a value measured using the following method. A measurement target is cut in liquid nitrogen, and a cross-section thereof is observed using an electron microscope (VE-9800, manufactured by Keyence Corporation). In the cross-section, the thickness of the coating layer which is formed around the carbon fiber is measured at 100 positions, and the average value thereof is obtained.

Additionally, the resin composition (and the resin molded article) according to the exemplary embodiment may have a constitution where a compatibilizer ensures partial compatibility between the coating layer and the polyolefin.

Figure 2:
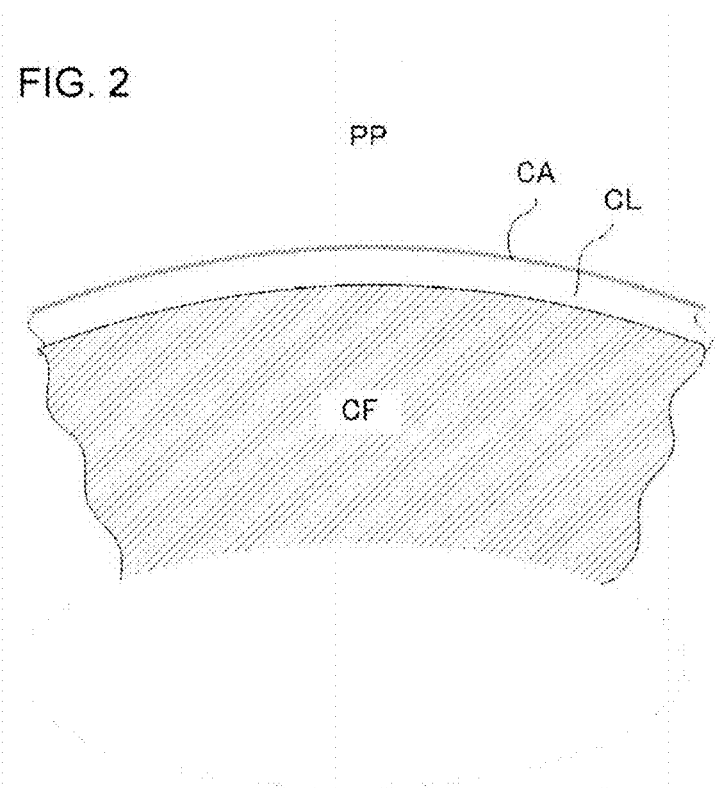
FIG. 2 is a schematic diagram showing one example of major parts of a resin molded article according to an exemplary embodiment of the invention.

Specifically, it is preferable that a layer of the compatibilizer lies between the coating layer formed of the specific resin and the polyolefin as the matrix (see FIG. 2). In other words, it is preferable that a layer of compatibilizer is formed on the surface of coating layer and, via the layer of compatibilizer, the coating layer and the polyolefin are adjacent to each other. Although the compatibilizer is formed into a layer thinner than the coating layer, the presence of the layer of the compatibilizer makes it possible to enhance adhesiveness (bonding) between the coating layer and polyolefin, and thereby it becomes easy to obtain a resin molded article superior in mechanical strength, especially, bending elastic modulus and tensile elastic modulus. By the way, in FIG. 2, PP represents a polyolefin, CF represents a carbon fiber, CL represents a coating layer and CA represents a layer of the compatibilizer.

In particular, it is preferable that the layer of compatibilizer lies between the coating layer and the polyolefin in a state of being bonded with the coating layer (via hydrogen bonding or by forming covalent bonds through the reaction of functional groups between the compatibilizer and the specific resin) and being compatibilized with the polyolefin. This constitution is likely to be performed, e.g., by the use of a compatibilizer of the kind which not only has a structure similar to that of the polyolefin being the matrix or a structure compatible with the polyolefin being the matrix but also contains a site capable of reacting with the functional group of the above-described specific resin at a portion of the molecule.

More specifically, it is preferable that, in an exemplary case where polyamide is used as the specific resin and a maleic anhydride-modified polyolefin is used as the compatibilizer, a layer of a maleic anhydride-modified polyolefin (a layer of the compatibilizer) favorably lies therebetween in such a manner that carboxy groups formed by ring-opening of the maleic anhydride moieties and the amine residues in the polyamide are reacted to form bonding, while the polyolefin moiety of the compatibilizer is in a state of being compatible with the polyolefin.

A method for ascertaining that the layer of a compatibilizer lies between the coating layer and the polyolefin will be described below.

An infrared spectrometer (NICOLET 6700FT-IR, a product of Thermo Fisher Scientific, Inc.) is used as an analyzer. For example, in the case of a resin composition (or a resin molded article) containing polypropylene (abbreviated as PP hereafter) as polyolefin, PA66 as polyamide and maleic anhydride-modified polypropylene (abbreviated as MA-PP hereafter) as modified polyolefin, IR spectral measurements according to a KEr tablet method are performed on the mixture (i.e., the resin composition), a mixture of PP and PA66, a mixture of PP and MA-PP, and as a reference, PP in itself, PA66 in itself and MA-PP in itself, respectively, and the area of peaks which are present in a range from a wavelength of 1820 $cm^{-1}$ to a wavelength of 1750 $cm^{-1}$ (peaks characteristic to MA-PP) which is originated in the acid anhydride contained in the mixture is subjected to comparative analyses. With respect to the mixture of PP, PA66 and MA-PP, reduction in the area of peaks originated in MA-PP is confirmed, and thereby it is ascertained that reaction between MA-PP and PA66 occurred. In this way, it is possible to ascertain the presence of a layer of compatibilizer (a bonding layer) between the coating layer and the polyolefin. In more detail, at the time when reaction occurs between MA-PP and PA66, cyclic moieties derived from maleic anhydride in MA-PP open their circles and form a chemical bond with the amine residue of PA66, and thus, the number of the cyclic moieties derived from maleic anhydride are reduced. Accordingly, the presence of a layer of the compatibilizer (a bonding layer) between the coating layer and the polyolefin can be ascertained.

Hereinafter, the details of each component of the resin composition according to the exemplary embodiment will be described.

Polyolefin

The polyolefin is the matrix of the resin composition and a resin component which is reinforced by the carbon fiber (also referred to as "matrix resin").

As the polyolefins, one kind may be used alone, or two or more kinds may be used in combination.

Polyolefin is a resin containing a repeating unit derived from olefin and may contain a repeating unit derived from a monomer other than olefin in an amount of 30% by weight with respect to the total weight of the resin.

Polyolefin is obtained by addition polymerization of olefin (optionally, the monomer other than olefin).

In addition, regarding each of olefin and the monomer other than olefin for obtaining polyolefin, one kind may be used alone, or two or more kinds may be used in combination.

Polyolefin may be a copolymer or a homopolymer. In addition, polyolefin may be linear or branched.

Examples of the olefin described herein include linear or branched aliphatic olefins and alicyclic olefins.

Examples of the aliphatic olefins include α-olefins such as ethylene, propylene, 1-butene, 1-hexene, 4-methyl-1-pentene, 1-octene, 1-decene, 1-hexadecene, and 1-octadecene.

In addition, examples of the alicyclic olefins include cyclopentene, cycloheptene, norbornene, 5-methyl-2-norbornene tetracyclododecene, and vinylcyclohexane.

Among these, from the viewpoint of reducing the cost, α-olefin is preferable, ethylene or propylene is more preferable, and propylene is still more preferable.

In addition, the monomer other than olefin is selected from well-known addition-polymerizable compounds.

Examples of the addition-polymerizable compounds include: styrenes such as styrene, methylstyrene, α-methylstyrene, β-methylstyrene, t-butylstyrene, chlorostyrene, chloromethylstyrene, methoxystyrene, styrenesulfonic acid, and salts thereof; (meth)acrylates such as alkyl (meth) acrylate, benzyl (meth)acrylate, and dimethylaminoethyl (meth)acrylate; halovinyls such as vinyl chloride; vinyl esters such as vinyl acetate and vinyl propionate; vinyl ethers such as vinyl methyl ether; vinylidene halides such as vinylidene chloride; and N-vinyl compounds such as N-vinylpyrrolidone.

Preferable examples of polyolefin in the exemplary embodiment include polypropylene (PP), polyethylene (PE), polybutene, polyisobutylene, coumarone-indene resins, terpene resins, and ethylene-vinyl acetate copolymer resins (EVA).

Among these, a resin composed of only a repeating unit derived from olefin is preferable. In particular, from the viewpoint of reducing the cost, polypropylene is preferable.

The molecular weight of the polyolefin is not particularly limited and may be determined according to, for example, the kind of the resin, molding conditions, and the use of the resin molded article. The weight average molecular weight (Mw) thereof is preferably from 10,000 to 300,000 and more preferably from 10,000 to 200,000.

As in the case of the molecular weight, the glass transition temperature (Tg) or melting temperature (Tm) of the polyolefin is not particularly limited and may be determined according to, for example, the kind of the resin, molding conditions, and the use of the resin molded article. For example, when the polyolefin is polyolefin, the melting temperature (Tm) thereof is preferably from 100° C. to 300° C. and more preferably from 150° C. to 250° C.

The weight average molecular weight (Mw) and melting temperature (Tm) of polyolefin is a value measured using the following method.

That is, the weight average molecular weight (Mw) of polyolefin is measured by gel permeation chromatography (GPC) under the following conditions. As a GPC system, a high-temperature GPC system "HLC-8321 GPC/HT" is used. As an eluent, o-dichlorobenzene is used. Polyolefin is dissolved in o-dichlorobenzene at a high temperature (140° C. to 150° C.), and the solution is filtered to obtain the filtrate as a measurement sample. The measurement is performed using an RI detector under the following measurement conditions of sample concentration: 0.5%, flow rate: 0.6 ml/min, and sample injection amount: 10 μl. In addition, a calibration curve is prepared from 10 samples, "Polystyrene Standard Sample TSK Standard": "A-500", "F-1", "F-10", "F-80", "F-380", "A-2500", "F-4", "F-40", "F-128", and "F-700" (manufactured by Tosoh Corporation).

In addition, the melting temperature (Tm) of polyolefin is calculated from the DSC curve obtained from differential scanning calorimetry (DSC) according to a "melting peak temperature" described in a method of calculating melting temperature in "Testing methods for transition temperatures of plastics" of JIS K7121-1987.

The content of the polyolefin as the matrix may be determined according to, for example, the use of the resin molded article. For example, the content of the polyolefin is preferably from 5% by weight to 95% by weight, more preferably from 10% by weight to 95% by weight, and still more preferably from 20% by weight to 95% by weight with respect to the total weight of the resin composition.

Carbon Fiber

As the carbon fiber, a well-known carbon fiber is used, and any one of a PAN carbon fiber and a pitch carbon fiber is used.

The carbon fiber may undergo a well-known surface treatment.

Examples of the surface treatment for the carbon fiber include an oxidation treatment and a sizing treatment.

In addition, the fiber diameter, the fiber length, and the like of the carbon fiber are not particularly limited and may be selected according to, for example, the use of the resin molded article.

Further, the form of the carbon fiber is not particularly limited and may be selected according to, for example, the use of the resin molded article. Examples of the form of the carbon fiber include a fiber bundle including a large number of single fibers, a fiber aggregate including fiber bundles, and a woven fabric in which fibers are two-dimensionally or three-dimensionally woven.

As the carbon fiber, a commercially available product may be used.

Examples of a commercially available product of the PAN carbon fiber include "TORAYCA" (registered trade name; manufactured by Toray Industries Inc.), "TENAX" (manufactured by Toho Tenax Co., Ltd.), and "PYROFIL" (registered trade name; manufactured by Mitsubishi Rayon Co., Ltd.). Other examples of a commercially available product of the PAN carbon fiber include commercially available products manufactured by Hexcel Corporation, Cytec Industries Inc., Dow-Aksa, Formosa Plastics Group, and SGL Carbon Japan Co., Ltd.

Examples of a commercially available product of the pitch carbon fiber include "DYAD" (registered trade name; manufactured by Mitsubishi Rayon Co., Ltd.), "GRANOC" (manufactured by Nippon Graphite Fiber Co., Ltd.), and "KUREKA" (manufactured by Kureha Corporation). Other examples of a commercially available product of the pitch carbon fiber include commercially available products manufactured by Osaka Gas Chemical Co., Ltd. and Cytec Industries Inc.

Among these carbon fibers, one kind may be used alone, or two or more kinds may be used in combination.

The content of the carbon fiber is preferably from 0.1 parts by weight to 200 parts by weight, more preferably from 1 part by weight to 180 parts by weight, and still more preferably from 5 parts by weight to 150 parts by weight with respect to 100 parts by weight of the polyolefin as the matrix.

By adjusting the content of the carbon fiber to be 0.1 parts by weight or more with respect to 100 parts by weight of the polyolefin, the resin composition is reinforced. In addition, by adjusting the content of the carbon fiber to be 200 parts by weight or less with respect to 100 parts by weight of the polyolefin, the moldability during the preparation of the resin molded article is superior.

When not only carbon fiber but also a reinforcing fiber other than carbon fiber is used as a reinforcing fiber, the content of carbon fiber is preferably 80% by weight or higher with respect to the total weight of the reinforcing fiber including carbon fiber and the other reinforcing fibers.

Hereinafter, the content (part (s) by weight) with respect to 100 parts by weight of the polyolefin as the matrix will also be abbreviated as "phr (per hundred resin)".

When represented by this abbreviation, the content of the carbon fiber is from 0.1 phr to 200 phr.

Resin Containing at Least One of Amide Bond and Imide Bond (Specific Resin)

The specific resin is a resin which is formed around the carbon fiber as described above by containing a specific partial structure.

This specific resin will be described in detail.

It is preferable that the specific resin is a resin having a solubility parameter (SP value) different from that of the polyolefin as the matrix.

Here, the difference between the SP value of the polyolefin and the SP value of the specific resin is preferably 3 or more and more preferably from 3 to 6 from the viewpoints of compatibility therebetween and repulsion therebetween.

The SP value is a value calculated according to Fedor's method. Specifically, the solubility parameter (SP value) may be calculated, for example, using the following expression according to the description of Polym. Eng. Sci., vol. 14, p. 147 (1974).

$$\text{SP Value} = \sqrt{(Ev/v)} = \sqrt{(\Sigma \Delta ei / \Sigma \Delta vi)} \qquad \text{Expression:}$$

(wherein, Ev evaporation energy (cal/mol), v: molar volume (cm³/mol), Δei: evaporation energy of each of atoms or an atom group, Δvi: molar volume of each of atoms or an atom group)

$(cal/cm^3)^{1/2}$ is adopted for the unit of the solubility parameter (SP values). However, the unit will be omitted in accordance with customs, and the SP values will be represented in a dimensionless form.

In addition, the specific resin contains at least one of an imide bond and an amide bond in the molecule thereof.

By containing the imide bond or the amide bond, the specific resin exhibits affinity to a polar group present on a surface of the carbon fiber.

As the specific resin, specifically, a thermoplastic resin containing at least one of an imide bond and an amide bond in the main chain thereof is used, and specific examples thereof include polyamide (PA), polyimide (PI), polyamide imide (PAI), polyether imide (PEI), and polyamino acid.

It is preferable that the specific resin has low compatibility to the polyolefin as the matrix and has a SP value different from that of the polyolefin. Therefore, it is preferable that the specific resin is a different kind of thermoplastic resin from the polyolefin as the matrix.

In particular, polyamide (PA) is preferable from the viewpoints of further improving bending elastic modulus and tensile elastic modulus and obtaining superior adhesion with the carbon fiber.

Here, the adhesion between the specific resin and the carbon fiber is evaluated based on an index such as interfacial shear strength.

Figure 3:
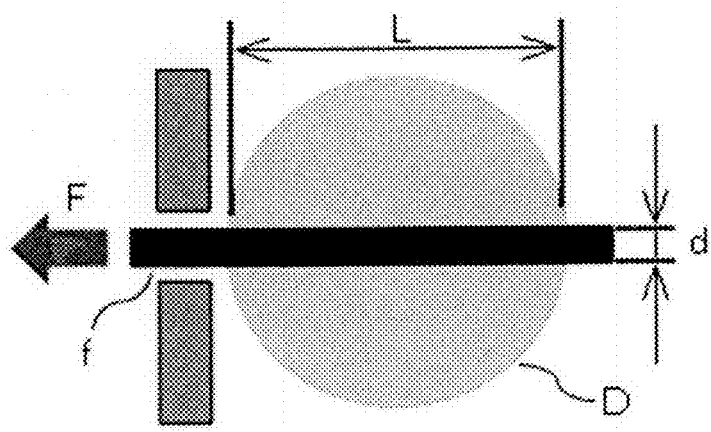
FIG. 3 is a schematic diagram showing a test in which a micro droplet method is used.

The interfacial shear strength is measured using a micro droplet method. Here, the micro droplet method will be described using a schematic diagram of a test shown in FIG. 3.

In a test using the micro droplet method, a droplet D (also called "resin droplet" or "resin ball") is attached to be fixed to a single fiber f by applying a liquid resin thereto, and the single fiber f is pulled out in a direction indicated by an arrow to evaluate the interfacial adhesion between the single fiber f and the droplet D.

Based on this test, the interfacial shear strength (τ) is calculated using the following expression.

$$\tau = \frac{F}{d\pi L}$$

In the expression, τ represents the interfacial shear strength, F represents the pull-out load, d represents the fiber diameter of the single fiber, and L represents the droplet length.

A high value of the calculated interfacial shear strength (τ) indicates high adhesion between the carbon fiber and the specific resin and is also an index indicating that a resin molded article having high bending elastic modulus and tensile elastic modulus may be formed by selecting a combination of the carbon fiber and the specific resin having a high interfacial shear strength.

Examples of the polyamide include products obtained by copolycondensation of dicarboxylic acid and diamine and products obtained by ring-opening polycondensation of lactam.

Examples of the dicarboxylic acid include oxalic acid, adipic acid, suberic acid, sebacic acid, terephthalic acid, isophthalic acid, 1,4-cyclohexanedicarboxylic acid, malonic acid, succinic acid, glutaric acid, pimelic acid, azelaic acid, and phthalic acid. Among these, adipic acid or terephthalic acid is preferable.

Examples of the diamine include ethylene diamine, pentamethylenediamine, hexamethylenediamine, nonanediamine, decamethylenediamine, 1,4-cyclohexanediamine, p-phenylenediamine, m-phenylenediamine, and m-xylenediamine. Among these, hexamethylenediamine is preferable.

Examples of the lactam include ε-caprolactam, undecanelactam, and lauryl lactam. Among these, ε-caprolactam is preferable.

Examples of polyamide, which is preferable from the viewpoints of affinity (adhesion) to the carbon fiber and moldability of the resin molded article, include polyamide (PA6) obtained by ring-opening polycondensation of ε-caprolactom, nylon 6.6, nylon 6.10, nylons 1 to 12, MXD known as an aromatic nylon, HT-1m, nylon 6-T, polyaminotriazole, polybenzimidazole, polyoxadiazole, polyamideimide, and piperidinepolyimide. Among these, nylon 6.6 is preferable.

The molecular weight of the specific resin is not particularly limited as long as it is more likely to be melted than the polyolefin which is present together as the matrix in the resin composition. For example, when the specific resin is polyamide, the weight average molecular weight thereof is preferably from 10,000 to 300,000 and more preferably from 10,000 to 100,000.

In addition, as in the case of the molecular weight, the glass transition temperature or melting temperature of the specific resin is not particularly limited, as long as it is more likely to be melted than the polyolefin which is present together as the matrix in the resin composition. For example, when the specific resin is polyamide, the melting temperature (Tm) thereof is preferably from 100° C. to 400° C. and more preferably from 150° C. to 350° C.

The content of the specific resin is preferably from 0.1 parts by weight to 20 parts by weight, more preferably from 0.5 parts by weight to 20 parts by weight, and still more preferably from 1 part by weight to 20 parts by weight with respect to 100 parts by weight of the polyolefin as the matrix.

By adjusting the content of the specific resin to be within the above-described range, the affinity to the carbon fiber is obtained, and the bending elastic modulus and tensile elastic modulus may be improved.

From the viewpoint of effectively exhibiting the affinity to the carbon fiber, it is preferable that the content of the specific resin is proportional to the above-described content of the carbon fiber.

The content of the specific resin is preferably from 1% by weight to 10% by weight, more preferably 1% by weight to 9% by weight, and still more preferably 1% by weight to 8% by weight with respect to the weight of the carbon fiber.

When the content of the specific resin is 1% by weight or higher with respect to the weight of the carbon fiber, the affinity between the carbon fiber and the specific resin is likely to be obtained. When the content of the specific resin is 10% by weight or lower with respect to the weight of the carbon fiber, resin fluidity is improved.

Compatibilizer

The compatibilizer improves the affinity between the polyolefin as the matrix and the specific resin.

The compatibilizer may be determined according to the polyolefin as the matrix.

It is preferable that the compatibilizer has the same structure as the polyolefin which is the matrix or a structure compatible with the polyolefin, and contains a portion having affinity to the above-described specific resin or a portion capable of reacting with a functional group contained in the specific resin in a portion of the molecule.

A modified polyolefin may be used as the compatibilizer.

Here, when the polyolefin is polypropylene (PP), a modified polypropylene (PP) is preferable as the modified polyolefin. Likewise, when the polyolefin is an ethylene-vinyl acetate copolymer resin (EVA), a modified ethylene-vinyl acetate copolymer resins (EVA) is preferable as the modified polyolefin.

Examples of the modified polyolefin include polyolefins into which a modification site containing a carboxy group, a carboxylic anhydride residue, a carboxylate residue, an imino group, an amino group, an epoxy group or the like, is introduced.

From the viewpoints of further improving the affinity between the polyolefin as the matrix and the specific resin and considering the upper limit temperature during molding, as the modification site to be introduced into polyolefin, a carboxylic anhydride residue is preferable, and a maleic anhydride residue is more preferable.

The modified polyolefin may be obtained using, for example, a method of causing a compound containing the above-described modification site to react with polyolefin such that the modification site is directly chemically bonded to polyolefin or a method of forming a graft chain using a compound containing the above-described modification site and bonding the graft chain to polyolefin.

Examples of the compound containing the above-described modification site include maleic anhydride, fumaric anhydride, citric anhydride, N-phenylmaleimide, N-cyclohexylmaleimide, glycidyl (meth)acrylate, glycidyl vinylbenzoate, N-[4-(2,3-epoxypropoxy)-3,5-dimethylbenzyl]acrylamide, alkyl (meth)acrylate, and derivatives thereof.

In particular, modified polyolefin obtained by causing maleic anhydride as an unsaturated carboxylic acid to react with polyolefin is preferable.

Specific examples of the modified polyolefin include acid-modified polyolefins such as maleic anhydride-modified polypropylene, maleic anhydride-modified polyethylene, a maleic anhydride-modified ethylene-vinyl acetate copolymer resin (EVA), and adducts or copolymers thereof.

As the modified polyolefin, a commercially available product may be used.

Examples of the modified propylene include YOUMEX (registered trade name) series (100TS, 110TS, 1001, 1010) manufactured by Sanyo Chemical Industries, Ltd.

Examples of the modified polyethylene include YOUMEX (registered trade name) series (2000) manufactured by Sanyo Chemical Industries, Ltd. and MODIC (registered trade name) series manufactured by Mitsubishi Chemical Corporation.

Examples of the modified ethylene-vinyl acetate copolymer resin (EVA) include MODIC (registered trade name) series manufactured by Mitsubishi Chemical Corporation.

The molecular weight of the compatibilizer is not particularly limited and, from the viewpoint of workability, is preferably from 5,000 to 100,000 and more preferably 5,000 to 80,000.

The content of the compatibilizer is preferably from 0.1 parts by weight to 20 parts by weight, more preferably from 0.1 parts by weight to 18 parts by weight, and still more preferably from 0.1 part by weight to 15 parts by weight with respect to 100 parts by weight of the polyolefin as the matrix.

By adjusting the content of the compatibilizer to be within the above-described range, the affinity between the polyolefin as the matrix and the specific resin is improved, and the bending elastic modulus and tensile elastic modulus may be improved.

From the viewpoint of effectively exhibiting the affinity between the polyolefin as the matrix and the specific resin, it is preferable that the content of the compatibilizer is proportional to the content of the above-described specific resin (is indirectly proportional to the content of the carbon fiber).

The content of the compatibilizer is preferably from 1% by weight to 15% by weight, more preferably 1% by weight to 12% by weight, and still more preferably 1% by weight to 10% by weight with respect to the weight of the carbon fiber.

When the content of the compatibilizer is 1% by weight or higher with respect to the weight of the carbon fiber, the affinity between the carbon fiber and the specific resin is likely to be obtained. When the content of the compatibilizer is 15% by weight or lower (in particular, 10% by weight or lower) with respect to the weight of the carbon fiber, the remaining of an unreacted functional group caused by discoloration or deterioration is prevented.

Other Components

The resin composition according to the exemplary embodiment may contain other components in addition to the above-described components.

Examples of the other components include well-known additives such as a flame retardant, a flame retardant auxiliary agent, a dripping inhibitor during heating, a plasticizer, an antioxidant, a release agent, a light resistant agent, a weather resistant agent, a colorant, a pigment, a modifier, an antistatic agent, a hydrolysis inhibitor, a filler, a reinforcing agent other than the carbon fiber, (for example, talc, clay, mica, glass flake, milled glass, glass beads, crystalline silica, alumina, silicon nitride, aluminum nitride, or boron nitride).

The content of the other components is preferably from 0 parts by weight to 10 parts by weight and more preferably from 0 parts by weight to 5 parts by weight with respect to 100 parts by weight of the polyolefin as the matrix. Here, "0 parts by weight" represents that the resin composition does not contain the other components.

Method of Preparing Resin Composition

The resin composition according to the exemplary embodiment is prepared by molten-kneading the respective components.

Here, a well-known unit is used as a molten-kneading unit, and examples thereof include a twin-screw extruder, a Henschel mixer, a Bunbury mixer, a single-screw extruder, a multi-screw extruder, and a co-kneader.

The temperature (cylinder temperature) during molten-kneading may be determined according to, for example, the melting temperature of the resin components constituting the resin composition.

In particular, it is preferable that the resin composition according to the exemplary embodiment is obtained using a preparing method including: molten-kneading the polyolefin, the carbon fiber, the specific resin, and the compatibilizer. When the polyolefin, the carbon fiber, the specific resin, and the compatibilizer are collectively molten-kneaded, the coating layer which is formed around the carbon fiber using the specific resin is likely to be thin and substantially uniform and has high bending elastic modulus and tensile elastic modulus.

Resin Molded Article

The resin molded article according to the exemplary embodiment includes four components including: a polyolefin; carbon fiber; a resin (specific resin) containing at least one of an amide bond and an imide bond; and a compatibilizer. That is, the resin molded article according to the exemplary embodiment has the same composition as the resin composition according to the exemplary embodiment. The resin containing at least one of an amide bond and an imide bond forms a coating layer around the carbon fiber, and a thickness of the coating layer is from 50 nm to 700 nm.

The resin molded article according to the exemplary embodiment may be obtained by preparing the resin composition according to the exemplary embodiment and molding the resin composition, or may be obtained by preparing a composition containing components other than the carbon fiber and mixing the composition with the carbon fiber during molding.

Examples of a molding method include injection molding, extrusion molding, blow molding, hot press molding, calendering, coating molding, cast molding, dipping molding, vacuum molding, and transfer molding.

As the molding method of the resin molded article according to the exemplary embodiment, injection molding is preferable from the viewpoint of obtaining high degree of freedom for the shape.

The cylinder temperature during injection molding is, for example, from 180° C. to 300° C. and preferably from 200° C. to 280° C. The mold temperature during injection molding is, for example, from 30° C. to 100° C. and preferably from 30° C. to 60° C.

The injection molding may be performed using a commercially available machine such as "NEX150" (manufactured by Nissei Plastic Industrial Co., Ltd.), "NEX70000" (manufactured by Nissei Plastic Industrial Co., Ltd.), or "SE50D" (manufactured by Toshiba Machine Co., Ltd.).

The resin molded article according to the exemplary embodiment is preferably used in applications such as electronic and electric apparatuses, business machines, home electronics, automobile interior materials, and containers. Specific examples of the applications include: cases of electronic and electric apparatuses and home electronics; various components of electronic and electric apparatuses and home electronics, automobile interior components; storage cases of CD-ROM, DVD, and the like; tableware; beverage bottles; food trays; wrapping materials; films; and sheets.

In particular, in the resin molded article according to the exemplary embodiment, the carbon fiber is used as the reinforcing fiber, and thus the mechanical strength is superior. Therefore, the resin molded article according to the exemplary embodiment is preferable as an alternative to a metal component.

EXAMPLES

Hereinafter, the invention will be described in more detail using Examples but is not limited to these examples.

Examples 1 to 10 and Comparative Examples 1 to 9

Pellets of resin compositions are obtained by kneading components shown in Tables 1 to 2 (the numerals in the tables each mean the number by parts) using a twin-screw extruder (TEM58SS, manufactured by Toshiba Machine Co., Ltd.) at a cylinder temperature of 200° C.

The obtained pellets are molded using an injection molding machine (NEX150, manufactured by Nissei Plastic Industrial Co., Ltd.) at a cylinder temperature of 270° C. and a mold temperature of 50° C. to obtain ISO multi-purpose dumbbell specimens (corresponding to ISO 527 tensile test and ISO 178 bending test; thickness: 4 ram, width: 10 mm) and D2 specimens (length: 60 mm, width: 60 mm, thickness: 2 mm).

Evaluation

Using the obtained two kinds of specimens, the following evaluation is performed.

The results are shown in Tables 1 and 2.

Bending Elastic Modulus

Regarding each of the obtained ISO multi-purpose dumbbell specimens, the bending elastic modulus is measured using a universal tester (AUTOGRAPH AG-Xplus, manufactured by Shimadzu Corporation) according to a method defined in ISO 178.

Tensile Elastic Modulus and Elongation

Regarding each of the obtained ISO multi-purpose dumbbell specimens, the tensile elastic modulus and elongation are measured using an evaluation device (precision universal tester AUTOGRAPH AG-IS 5 kN, manufactured by Shimadzu Corporation) according to a method defined in ISO 527.

Deflection Temperature Under Load (HDT)

Regarding each of the obtained ISO multi-purpose dumbbell specimens, a deflection temperature (° C.) under a load of 1.8 MPa is measured using a HDT measuring device (HDT-3, manufactured by Toyo Seiki Seisaku-Sho, Ltd.) according to a method defined in ISO 178 bending test.

Dimensional Change Rate

Each of the obtained D2 specimens is allowed to stand for 24 hours under conditions of 28° C. and 31% RH, and the dimensional change rate (%) between the dimensions before and after the standing in a TD direction and an MD direction of the specimen is measured.

The dimensional change is measured using a measuring microscope (STM6-LM, manufactured by Olympus Corporation).

Measurement of Thickness of Coating Layer

Using each of the obtained D2 specimens, the thickness of a coating layer is measured using the method in the described methods. Before the measurement whether or not a coating layer is formed is determined. In Tables 1 and 2, the symbol "-" represents that a coating layer is formed and the thickness of the coating layer is from 50 nm to 700 nm.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Composition | Polyolefin | | | | | | | | | | |
| | Polypropylene | 100 | 100 | 100 | 100 | | | | | | |
| | Polyethylene | | | | | 100 | 100 | 100 | | | |
| | EVA | | | | | | | | 100 | 100 | 100 |
| | Reinforcing Fiber | | | | | | | | | | |
| | Carbon Fiber (Surface-Treated) | 5 | 200 | 25 | | 5 | 200 | 25 | 5 | 200 | 25 |
| | Carbon Fiber (Not Surface-Treated) | | | | 25 | | | | | | |
| | Specific Resin | | | | | | | | | | |
| | Polyamide (PA6) | 0.1 | 20 | 5 | 5 | | | | | | |
| | Polyamide (PA66) | | | | | 0.1 | 20 | 5 | | | |
| | Polyamide (PA6T) | | | | | | | | 0.1 | 20 | 5 |
| | Compatibilizer | | | | | | | | | | |
| | Maleic Anhydride-Modified Polypropylene | 0.1 | 20 | 3 | 3 | | | | | | |
| | Maleic Anhydride-Modified Polyethylene | | | | | 0.1 | 20 | 3 | | | |
| | Maleic Anhydride-Modified EVA | | | | | | | | 0.1 | 20 | 3 |
| | Total | 105.2 | 340 | 133 | 133 | 105.2 | 340 | 133 | 105.2 | 340 | 133 |
| Conditions | Molten-Kneading Temperature (° C.) | 240 | 240 | 240 | 240 | 280 | 280 | 280 | 330 | 330 | 330 |
| | Injection Molding Temperature (° C.) | 240 | 240 | 240 | 240 | 280 | 280 | 280 | 330 | 330 | 330 |
| Evaluation | Bending Elastic Modulus (Gpa) | 2 | 25 | 12 | 12 | 1.6 | 19.8 | 7.2 | 15 | 17.2 | 6.5 |
| | Tensile Strength (MPa) | 48 | 221 | 82 | 80 | 42 | 152 | 65 | 40 | 148 | 58 |
| | Elongation (%) | 5 | 1 | 2 | 2 | 52 | 12 | 34 | 67 | 15 | 38 |
| | Deflection Temperature (° C.) Under Load (HDT) | 132 | 198 | 168 | 163 | 92 | 122 | 105 | 82 | 112 | 101 |
| | Dimension Change Ratio TD/MD (%) | 0.5/0.4 | 0.1/0.08 | 0.2/0.1 | 0.2/0.1 | 0.5/0.4 | 0.1/0.08 | 0.2/0.1 | 0.5/0.4 | 0.1/0.08 | 0.2/0.1 |
| | Thickness (nm) of Coating Layer | 523 | — | 80 | 78 | 486 | — | 65 | — | — | — |

TABLE 2

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Composition | Polyolefin | | | | | | | | | |
| | Polypropylene | 100 | 100 | 100 | 100 | 100 | 100 | 100 | 100 | 100 |
| | Reinforcing Fiber | | | | | | | | | |
| | Carbon Fiber (Surface-Treated) | | | | | 5 | 25 | 200 | 25 | 25 |
| | Specific Resin | | | | | | | | | |
| | Polyamide (PA6) | | 0.1 | 20 | | | | | 5 | |
| | Compatibilizer | | | | | | | | | |
| | Maleic Anhydride-Modified Polypropylene | | 0.1 | 20 | | | | | 3 | |
| | Modifier | | | | | | | | | |
| | Copolymer A | | | | | | | | | 8 |
| | Total | 100 | 100.2 | 140 | 105 | 125 | 300 | 130 | 128 | 133 |
| Conditions | Molten-Kneading Temperature (° C.) | 200 | 200 | 200 | 200 | 200 | 200 | 200 | 200 | 230 |
| | Injection Molding Temperature (° C.) | 270 | 270 | 270 | 270 | 270 | 270 | 270 | 270 | 270 |
| Evaluation | Bending Elastic Modulus (Gpa) | 1.3 | 1.3 | 1.4 | 1.5 | 5.8 | Molding Failure | 5.9 | 5.6 | 6.3 |
| | Tensile Strength (MPa) | 34 | 33 | 39 | 42 | 51 | 190 | 52 | 64 | 75 |
| | Elongation (%) | 82 | 56 | 16 | 9 | 2.1 | 1 | 2.1 | 1.6 | 0.5 |
| | Deflection Temperature (° C.) Under Load (HDT) | 98 | 99 | 108 | 125 | 145 | 184 | 145 | 145 | 152 |
| | Dimension Change Ratio TD/MD (%) | 1.1/0.98 | 1.2/1.2 | 1.0/0.9 | 0.8/0.7 | 0.5/0.6 | 0.2/0.1 | 0.5/0.5 | 0.5/0.6 | 0.5/0.6 |
| | Thickness (nm) of Coating Layer | Not Coated | Not Coated | Not Coated | Not Coated | Not Coated | Not Coated | 801 | Not Coated | 754 |

The details of materials shown in Tables 1 and 2 are as follows.

Polyolefin
  Polypropylene (NOVATEC (registered trade name) PP MA3, manufactured by Japan Polypropylene Corporation), SP value: 9.3
  Polyethylene (ULTZEX 20100J, manufactured by Prime Polymer Co., Ltd.), SP value: 8.0
  EVA: ethylene-vinyl acetate copolymer resin (41X, manufactured by Du Pont-Mitsui Fluorochemicals Co., Ltd.), SP value: 10.0

Reinforcing Fiber
Carbon Fiber
  Carbon fiber (surface-treated, TORAYCA (registered trade name) T300, manufactured by Toray Industries Inc.)
  Carbon fiber (not surface-treated, obtained by dipping TORAYCA in a solvent to remove a sizing agent)

Specific Resin
  Polyamide (PA6, ZYTEL (registered trade name) 7331J, manufactured by Dupont), SP value: 13.6
  Polyamide (PA66, 101L, manufactured by Dupont), SP value: 11.6
  Polyamide (PA6T, TY-502 NZ, manufactured by Toyobo Co., Ltd.), SP value: 13.5

Compatibilizer
  Maleic anhydride-modified polypropylene (YOUMEX (registered trade name) 110TS, manufactured by Sanyo Chemical Industries, Ltd.)
  Maleic anhydride-modified polyethylene (MODIC M142 manufactured by Mitsubishi Chemical Corporation)
  Maleic anhydride-modified EVA: maleic anhydride-modified ethylene-vinyl acetate copolymer resin (MODIC A543 manufactured by Mitsubishi Chemical Corporation)

Modifier
  Copolymer A
  Maleic anhydride-modified polypropylene (YOUMEX (registered trade name) 110TS, manufactured by Sanyo Chemical Industries, Ltd.) is mixed (dry-blended) with polyamide 6 (ZYTEL (registered trade name) 7331J, manufactured by Dupont) in a dry state at a mixing ratio of 3:5 (YOUMEX 110TS:ZYTEL 7331J). A pellet is obtained by kneading the mixture using a twin-screw extruder (TEM58SS, manufactured by Toshiba Machine Co., Ltd.) at a cylinder temperature of 240° C. This pellet is used as Copolymer A.

It is found from the above results that, in Examples, a molded article having superior bending elastic modulus and tensile elastic modulus is able to be obtained as compared to Comparative Examples.

In particular, it is found from a comparison between Example 3 and Comparative Examples 7 and 8 that bending elastic modulus and tensile elastic modulus cannot be sufficiently improved by using any one of the specific resin and the compatibilizer.

In addition, it is found that, under a condition where the content of the carbon fiber with respect to the polyolefin as the matrix is the same, Examples (Example 3) has superior results regarding not only bending elastic modulus and tensile elastic modulus but also deflection temperature under a load (HDT), elongation, and dimensional change rate as compared to Comparative Examples (Comparative Examples 4 to 6).

Further, in Comparative Example 9 in which Copolymer A is used and the coating layer is formed around the carbon fiber, the thickness of the coating layer is 754 nm. It is found that in Examples (for example, Example 3), the thickness of the coating layer is more appropriate than that in Comparative Example 9; as a result, the molded article having superior bending elastic modulus and tensile elastic modulus is able to be obtained. When the coating layers of Comparative Example 9 and Examples (for examples, Example 3) are observed using a scanning electron microscope (SEM), it is verified that, in Examples (for examples, Example 3), the coating layer formed around the carbon fiber is substantially uniform as compared to Comparative Example 9.

In addition, when the molded article obtained in each Example is analyzed in accordance with the method described above, it is ascertained that a layer of the compatibilizer used (a layer of maleic anhydride-modified polypropylene, a layer of maleic anhydride-modified polyethylene or a layer of maleic anhydride-modified ethylene-vinyl acetate copolymer resin (EVA)) lies between the coating layer and the polyolefin (a layer of compatibilizer is formed on the surface of the coating layer).

What is claimed is:

1. A resin composition comprising:
   a polypropylene;
   a carbon fiber;
   a polyamide 6; and
   a maleic anhydride-modified polyolefin,
   wherein the polyamide 6 forms a coating layer around the carbon fiber, and
   a thickness of the coating layer is from 78 nm to 523 nm.

2. The resin composition according to claim 1,
   wherein a layer of the maleic anhydride-modified polyolefin lies between the coating layer and the polypropylene.

3. The resin composition according to claim 1, wherein a content of the carbon fiber is from 0.1 parts by weight to 200 parts by weight with respect to 100 parts by weight of the polypropylene.

4. The resin composition according to claim 1, wherein a content of the polyamide 6 is from 0.1 parts by weight to 20 parts by weight with respect to 100 parts by weight of the polypropylene.

5. The resin composition according to claim 1, wherein a content of the maleic anhydride-modified polyolefin is from 0.1 parts by weight to 20 parts by weight with respect to 100 parts by weight of the polypropylene.

6. The resin composition according to claim 1, wherein a content of the polyamide 6 is from 1% by weight to 10% by weight with respect to the weight of the carbon fiber.

7. The resin composition according to claim 1, wherein a content of the maleic anhydride-modified polyolefin is from 1% by weight to 15% by weight with respect to the weight of the carbon fiber.

8. The resin composition according to claim 1, wherein a ratio of the amount of maleic anhydride-modified polyolefin to polyimide 6 in parts by weight is 0.6 to 1.0.

9. A resin molded article comprising:
   a polypropylene;
   a carbon fiber;
   a polyamide 6; and
   a maleic anhydride-modified polyolefin,
   wherein the polyamide 6 forms a coating layer around the carbon fiber, and
   a thickness of the coating layer is from 78 nm to 523 nm.

10. The resin molded article according to claim 9, wherein a layer of the maleic anhydride-modified polyolefin lies between the coating layer and the polypropylene.

11. The resin molded article according to claim 9, wherein a content of the carbon fiber is from 0.1 parts by weight to 200 parts by weight with respect to 100 parts by weight of the polypropylene.

12. The resin molded article according to claim 9, wherein a content of the polyimide 6 is from 0.1 parts by weight to 20 parts by weight with respect to 100 parts by weight of the polypropylene.

13. The resin molded article according to claim 9, wherein a content of the maleic anhydride-modified polyolefin is from 0.1 parts by weight to 20 parts by weight with respect to 100 parts by weight of the polypropylene.

14. The resin molded article according to claim 9, wherein a content of the polyamide 6 is from 1% by weight to 10% by weight with respect to the weight of the carbon fiber.

15. The resin molded article according to claim 9, wherein a content of the maleic anhydride-modified polyolefin is from 1% by weight to 15% by weight with respect to the weight of the carbon fiber.

16. The resin molded article according to claim 9, wherein a ratio of the amount of maleic anhydride-modified polyolefin to polyimide 6 in parts by weight is 0.6 to 1.0.

* * * * *